United States Patent Office 3,511,915
Patented May 12, 1970

---

3,511,915
METHOD OF PRODUCING AN ANTITUSSIVE EFFECT
Rolf Denss and Hugo Ryf, Basel, Switzerland, assignors to Geigy Chemical Corporation, Ardsley, N.Y., a corporation of New York
No Drawing. Filed Jan. 19, 1968, Ser. No. 699,047
Claims priority, application Switzerland, Jan. 24, 1967, 1,032/67
Int. Cl. A61k 27/00
U.S. Cl. 424—267    9 Claims

ABSTRACT OF THE DISCLOSURE

Novel method for producing an antitussive effect in warm-blooded animals such as mammals by means of substituted piperidine derivatives. An illustrative embodiment is the method of producing the above-described effect by administering to warm-blooded animals 4-(7,12-dioxa-3-azaspiro[5.6]dodec-3-yl)-4'-chlorobutyrophenone.

---

The present invention relates to a novel method for producing an antitussive effect in warm-blooded animals by administering compounds of the general formula

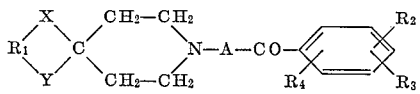

wherein

X and Y independently of each other represent oxygen or sulfur;
$R_1$ represents a divalent hydro-carbon residue with 2 to 11 carbon atoms which links X and Y by way of 2 to 4 carbon atoms;
$R_2$, $R_3$ and $R_4$ independently of each other represent hydrogen, lower alkyl, lower alkoxy or chlorine or $R_2$ and $R_3$ togethed represent methylenedioxy when $R_4$ is hydrogen; and
A represents straight-chained or branched-chained alkylidene or alkylene with at most four carbon atoms, or acid addition salts thereof.

Such compounds as well as their preparation are described in copending application Ser. No. 565,753, filed July 18, 1966, U.S. 3,424,755.

The compounds of the above-mentioned general formula and their acid addition salts exhibit an antitussive property. Accordingly, they are administered to warm-blooded animals, for instance, mammals, for the purpose of treating cough and various disorders, irritations etc. causing cough.

The antitussive activity of the above-described compounds is determined according to different methods:

(1) According to the method described by R. Domenjoz in Arch. expr. Path. und Pharmakol. 215, 19 bis 24 (1952), 30 to 65 mg./kg. of Numal "Roche" are administered intraperitoneally to cats of normal weight to induce a relatively superficial narcosis. About 45 minutes after the injection of the narcotic the preparation of the Nervus laryngeus superior was started by fitting on an irritation electrode. An apparatus manufactured by "Tektronix Inc.," a company of Portland 7, Oreg., U.S.A., comprising a direct current generator allowing irritation of the aforesaid nerve with rectangular current impulses of any desired frequency and intensity was connected to the electrode. The irritation frequency applied was 5 cycles at an irritation intensity between 0.5 and 3 volts. The irritation duration was about 8 seconds and the interval between two irritations was about 120 seconds.

For the registrations of the cough reflexes, a Marey capsule was used. A respiration cannula was introduced through the oral cavity down to the glottic chink.

The compounds tested were injected intravenously in the form of 1% aqueous solutions in minimum dosages necessary to suppress coughing in the cats during a minimum period of 15 minutes. The test results are given in Table I.

TABLE I

| Compound tested | Dosage administered in mg./kg. | Suppression of cough in x out of y cases (x/y) |
|---|---|---|
| 3-(1,4-dithia-8-azaspiro[4,5]dec-8-yl) propiophenone hydrochloride | 3.0 | 2/3 |
| 4-(3-phenyl-1,5-dioxa-9-azaspiro[5,5] undec-9-yl)butyrophenone hydrochloride | 3.0 | 2/3 |
| 3-(1,4-dioxa-8-azaspiro[4,5]dec-8-yl)-propiophenone hydrochloride | 1.0 | 3/4 |
| 2-(2-methyl-1,4-dioxa-8-azaspiro[4,5]dec-8-yl)acetophenone hydrochloride | 2.0 | 3/3 |
| 4-(7,12-dioxa-3-azaspiro-[5,6]dodec-3-yl)-4'-chlorobutyro-phenone hydrochloride | 0.5 | 3/3 |
| 2-methyl-3-(1,4-dioxa-8-azaspiro[4,5]dec-8-al)-3'-trifluoromethyl propiophenone hydrochloride | 0.5 | 2/3 |

(2) The antitussive activity was also determined according to a modification of the method described by H. Friebel et al.: Arch. exp. Path. and Pharmakol. 224, pp. 384–400 (1955). Male guinea pigs were put into a glass chamber and exposed to a mixture of $SO_2$–$CO_2$–air (proportion 20 ml.: 1.5 liter:10.5 liter per minute) under normal pressure until coughing occurred. The maximal exposure time was 120 seconds. Those test animals that reacted with coughing were divided into test groups of 6 animals each. To the so pretreated animals were administered orally the compounds of the present invention in dosages suitable to determine the $ED_{50}$ in mg./kg. The test, i.e., exposure to the irritating gas, was executed as described above 30 minutes after administration of the test compounds. The following results given in Table II were obtained (calculated by means of the probability graph table Schleicher and Schüll 298½).

TABLE II

Compound tested: $ED_{50}$ in mg./kg.
3 - (1,4-dithia-8-azaspiro[4,5]dec-8-al)propiophenone hydrochloride _____ 40.0
3 - (1,4-dioxa-8-azaspiro[4,5]dec-8-yl-4-methyl propiophenone hydrochloride _____ 40.0

The acute toxicity of the compounds of the instant invention is low: for instance, the $LD_{50}$ of 3-(1,4-dioxa-8-azaspiro[4,5]dec-8-yl)-propiophenone hydrochloride administered orally to mice is 453 mg./kg. and administered intravenously to mice 59 mg./kg. The acute toxicity in rats is 2980 mg./kg. on oral administration.

The compounds of the present invention may be used in warm-blooded animals, particularly mammals, as medicaments in the form of pharmaceutical compositions containing the compounds in admixture or conjunction with a pharmaceutical organic or inorganic, solid or liquid carrier for oral, rectal, or parenteral administration.

The total daily dosages for mammals vary from about 1 mg./kg. to about 50 mg./kg., preferably from about 2 mg./kg. to about 10 mg./kg.

While the compounds of the present invention may be administered via any of the usual routes, e.g., parenteral, rectal, intravenous routes or the like, the preferred one being the oral route. For such oral administration, the incorporation of the pharmaceutical carrier for the formation of a pharmaceutical composition is desirable but is not essential.

Such suitable compositions include without limitation, tablets, capsules, powders, solutions suspensions, sustained release formulations and the like.

To produce dosage units for peroral application, the presently claimed compounds may be combined, e.g., with solid pharmaceutically acceptable pulverulent carriers such as lactose, saccharose, sorbitol, mannitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights may be added, to form tablets or press coated tablets. The latter are coated, for example, with concentrated sugar solutions which can contain, e.g., gum arabic, talcum and/or titanium dioxide, or they are coated with a lacquer dissolved in easily volatile, organic solvents or a mixture of organic solvent. Dyestuffs can be added to these coatings, for example, to distinguish between different contents of active substance. An especially valuable feature of this invention is the fact that a compound of the general formula given above may be compressed into tablets which because of its relatively high melting point are stable at ordinary temperature. A further valuable feature in this respect is the nonhygroscopic nature of the compound.

Hard gelatin capsules contain, for example, granulates of the instant compositions with solid pulverulent carriers such as, e.g., lactose, saccharose, sorbitol, mannitol, and further starches such as potato starch, corn starch or amylopectin, cellulose derivatives or gelatin, as well as magnesium stearate or stearic acid.

Another way of administering orally the compound of the present invention, is in form of aqueous solutions, syrups, elixirs, etc.

Suppositories containing the compound of the present invention are readily obtained by techniques well known to those skilled in the art of compounding dosage forms. A compound of the present invention, for instance, can be dispersed in a carrier such as cocoa butter and the suppositories formed in the usual way. Other carriers can be used in place of cocoa butter as shown in the following examples.

Compositions suitable for parenteral administration are the known pharmaceutical forms for such administration, for example, sterile solutions in aqueous or oily media. The excipients used in these formulations are the excipients well known to the pharmacists. Preferably, water soluble salts of a compound as defined in the general formula are used for the preparation of formulations suitable for parenteral, especially intramuscular administration, in a concentration of preferably 0.5 to 5%.

The sterile aqueous isotonic solution for intravenous administration may be prepared by dissolving a compound of the above-mentioned formula in an appropriate medium, like, for instance, aqueous sodium chloride solution.

Depending on the nature of the specific condition, this invention may be practised in conjunction with the administration of other therapeutic agents. Thus, for example, the compounds described herein may be combined with aspirin, caffein, barbiturates, phenacetin, amphetamines, magnesium sulfate and the like.

This invention contemplates a method for producing an antitussive effect which comprises administering to warm-blooded animals, especially mammals suffering from any kind of disorder which causes cough, a therapeutic dose of a compound as described in the above-mentioned formula.

The following examples describe the process for the production of the compounds and compositions containing such compounds by way of illustration of, but not limitation on the scope of the present invention.

The temperatures are given in degrees centigrade.

EXAMPLE 1

3-(1,4-dithia-8-azaspiro[4,5]dec-8-yl)propiophenon hydrochloride

A mixture of 21 g. (0.1 mol) of 1,4-dithia-8-azaspiro [4,5]decane hydrochloride, 3.0 g. 0.1 mol) of paraformaldehyde and 12 g. (0.1 mol) of acetophenone in 50 ml. of ethanol is refluxed for 4 hours. The paraformaldehyde slowly dissolves. The ethanol is then distilled off in vacuo whereupon 3-(1,4-dithia-8-azaspiro[4,5]dec - 8-yl-propiophenone hydrocloride crystallises out. It is recrystallised from methanol/ether and melts at 220°.

EXAMPLE 2

3-(1,4-dioxa-8-azaspiro[4,5] dec-8-yl)propiophenone hydrochloride

A mixture of 18 g. (0.1 mol) of 1,4-dioxa-8-azaspiro [4,5]decane hydrochloride, 3,0 g. (0.1 mol) of paraformaldehyde and 12 g. (0.1 mol) of acetophenone in 50 ml. of ethanol is refluxed for 4 hours. The paraformaldehyde slowly dissolves. The ethanol is then distilled off in vacuo whereupon 3-(1,4-dioxa-8-azaspiro[4,5]dec-8-yl)-propiophenone hydrochloride crystallises out. It is recrystallised from methanol/ether and then melts at 175°.

EXAMPLE 3

10.0 g. of 3-(1,4-dioxa-8-azaspiro[4,5]dec - 8 - yl)propiophenone hydrochloride, 30.0 g. of lactose and 5.0 g. of highly disperse silicic acid are ultimately mixed; the mixture is moistened with a solution containing 5.0 g. of gelatine and 7.5 g. glycerine in distilled water and granulated through a sieve. After drying, the granulated material is strained and carefully admixed with 3.5 g. of poato starch, 3.5 of talcum, and 0.5 g. of magnesium stearate. The mixture is pressed into 1000 tablets each weighing 65 mg. and containing 10 mg. of 3-(1,4-dioxa-8-azaspiro [4,5]dec-8-yl)-propiophenone hydrochloride.

EXAMPLE 4

10.0 g. of 3-(1,4-dioxa-8-azaspiro[4,5]dec - 8 - yl) propiophenone hydrochloride, 15 g. of lactose, and 20 g. of potato starch are intimately mixed, the mixture is moistened with a solution containing 5.0 g. of gelatine and 7.5 g. of glycerine in distilled water and granulated through a sieve. After drying the granulated material is strained and carefully mixed with 3.5 g. of potato starch, 3.5 g. of talcum and 0.5 g. of magnesium stearate. The mixture is pressed into 1000 dragée cores which are coated with a concentrated syrup made from 26,600 g. of crystallised saccharose, 17.5000 g. of talcum, 1,000 g. of shellac, 3.750 g. of gum arabic, 1.000 g. of highly dispersed silicic acid and 0.090 g. of dyestuff and dried. Each of the dragées obtained weighs 115 mg. and contains 10 mg. of 3 - (1,4-dioxa-8-azaspiro[4,5]dec-8-yl) propiophenone hydrochloride.

EXAMPLE 5

A cough syrup is prepared by dissolving 20 g. of 3-(1,4-dioxa-8-azaspiro[4,5]dec-8-yl)propiophenone hydrochloride, 42 g. of p-hydroxy benzoic acid methylester, 18 g. of p-hydroxy benzoic acid propylester and 5000 g. of crystallised saccharose in distilled water and adding a flavor-improving substance, for instance, 250 g. of "Orange Peel Soluble Fluid," from Eli Lilly and Co., Indianapolis. The complete mixture should yield 10 l. of syrup.

EXAMPLE 6

A liquid cough cure is prepared by dissolving 500 g. of 3-(1,4-dioxa-8-azaspiro[4,5]dec - 8 - yl)propiophenone hydrochloride, 10 g. of ascorbic acid, saccharose, for instance, 50 g. of sodium cyclamate, a flavor-improving substance like, for instance 20 g. of natural lemon flavor and 20 g. of "half-and-half" extract and 2500 g. of 70% sorbit in distilled water to yield 10 liters of liquid altogether. The flavor-improving substance may be obtained from Haarman and Reiner, Holzmüchen, Germany.

EXAMPLE 7

A mass for the preparation of suppositories is prepared by intimately mixing 100 g. of 3-(1,4-dioxa-8-azaspiro[4,5]dec-8-yl)phopiophenone hydrochloride with 160.0 g. of adeps solidus. This mass is moulded into 100 suppositories each containing 100 mg. of the active substance.

EXAMPLE 8

2.0 g. of 3-(1,5-dioxa-8-azaspiro[4,5]dec - 8 - yl)propiophenone hydrochloride and 2.2 g. of glycerine are dissolved in distilled water yielding altogether 100 ml. The solution is brought into 100 ampoules of 1 ml. each. Each of the ampoules contains 20 mg. of active substance.

EXAMPLE 9

| Ingredient: | Quantity, mg. |
|---|---|
| 4-(7,12-dioxa - 3 - azaspiro[5,6]dodec - 3-yl)-4'-chloro butyrophenone hydrochloride | 100 |
| Corn starch U.S.P. | 50 |
| Lactose U.S.P. | 40 |
| Sap-O-Sil M5 | 4 |
| Gelatin U.S.P. | 5 |
| Magnesium stearate U.S.P. | 1 |

The above ingredients, after being thoroughly mixed, are pressed into single scored tablets.

EXAMPLE 10

50 mg. to 200 mg. of 4-(7,12-dioxa - 3 - azaspiro [5,6]dodec-3-yl)-4'-chloro butyrophenone hydrochloride are introduced into a two-piece gelatin No. 1 capsule.

EXAMPLE 11

| Ingredient: | Quantity, mg. |
|---|---|
| 2-methyl - 3 - (1,4-dioxa-8-azaspiro[4,5]-dec-8-yl)-3-trifluoromethyl propiophenone hydrochloride | 100 |
| Corn starch U.S.P. | 50 |
| Lactose U.S.P. | 40 |
| Cap-O-Sil M5 | 4 |
| Gelatin U.S.P. | 5 |
| Magnesium stearate U.S.P. | 1 |

The above ingredients, after being thoroughly mixed, are pressed into single scored tablets.

What is claimed is:

1. The method of producing an antitussive effect which comprises administering to mammals requiring antitussive treatment a therapeutically effective amount of a compound of the formula

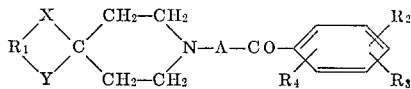

wherein

X and Y independently of each other represent oxygen or sulfur;

$R_1$ represents a divalent hydrocarbon residue with 2 to 11 carbon atoms which links X and Y by way of 2 to 4 carbon atoms;

$R_2$, $R_3$ and $R_4$ independently of each other represent hydrogen, lower alkyl, lower alkoxy or chlorine or $R_2$ and $R_3$ together represent methylenedioxy when $R_4$ is hydrogen;

and A represents straight-chained or branched-chain alkylidene or alkylene with at most four carbon atoms;

or a pharmaceutically acceptable acid addition salt thereof.

2. A method as defined in claim 1 wherein said compound is 3-(1,4-dithia-8-azaspiro[4,5]dec-8-yl)propiophenone hydrochloride.

3. A method as defined in claim 1 wherein said compound is 4-(3-phenyl - 1,5 - dioxa-9-azaspiro[5,5]undec-9-yl)butyrophenone hydrochloride.

4. A method as defined in claim 1 wherein said compound is 3-(1,4-dioxa - 8 - azaspiro[4,5]dec-8-yl)propiophenone hydrochloride.

5. A method as defined in claim 1 wherein said compound is 2-(2-methyl - 1,4 - dioxa-8-azaspiro[4,5]dec-8-yl)acetophenone hydrochloride.

6. A method as defined in claim 1 wherein said compound is 4-(7,12-dioxa - 3 - azaspiro[5,6]dodec-3-yl)-4'-chloro-butyrophenone hydrochloride.

7. A method as defined in claim 1 wherein said compound is 2-methyl - 3 - (1,4-dioxa-8-azaspiro[4,5]dec-8-yl)-3'-trifluoromethyl-propiophenone hydrochloride.

8. A method as defined in claim 1 wherein said compound is 3-(1,4-dioxa - 8 - azaspiro[4,5]dec-8-yl)-4-methyl propiophenone hydrochloride.

9. A method as defined in claim 1 wherein said compound is 2-(1,4-dioxa - 8 - azaspiro[4,5]dec-8-yl)propiophenone hydrochloride.

References Cited
UNITED STATES PATENTS

| | | | |
|---|---|---|---|
| 3,074,952 | 1/1963 | Casy et al. | 260—294.75 |
| 3,080,372 | 3/1963 | Janssen | 260—294.75 |
| 3,209,006 | 9/1965 | Wragge et al. | 260—294.75 |
| 3,424,755 | 1/1969 | Denss et al. | 260—293.4 |

ALBERT T. MEYERS, Primary Examiner

S. J. FRIEDMAN, Assistant Examiner